United States Patent

[11] 3,577,843

| [72] | Inventors | Louis F. Kutik<br>8720 S. W. 23rd Place, Fort Lauderdale, Fla. 33312;<br>Erich W. Gronemeyer, 2100 S. Ocean Lane, Fort Lauderdale, Fla. 33316 |
|---|---|---|
| [21] | Appl. No. | 822,819 |
| [22] | Filed | Apr. 9, 1969 |
| [45] | Patented | May 11, 1971 |

[54] APPARATUS FOR CONTROLLING BRISTLE DEFLECTION
15 Claims, 15 Drawing Figs.

[52] U.S. Cl. .................................................. 18/42,
18/comb & brush digest, 249/67, 264/243
[51] Int. Cl. ....................................................... B29c 11/00
[50] Field of Search............................................ 18/42 (D),
(R), (Dig.8); 249/79, 81, 66, 67, 68

[56] References Cited
UNITED STATES PATENTS

| 2,217,661 | 10/1940 | Anderson | 18/42D |
|---|---|---|---|
| 2,592,296 | 4/1952 | Kutik | 18/Dig.8 |
| 2,770,011 | 11/1956 | Kelly | 18/42DX |
| 2,783,501 | 3/1957 | Kutik | 18/Dig.8 |
| 3,004,291 | 10/1961 | Schad | 18/Dig.8 |
| 3,135,993 | 6/1964 | Ryan | 18/42DUX |
| 3,159,701 | 12/1964 | Herter | 18/42RUX |
| 3,183,292 | 5/1965 | Dvoracek | 18/42DX |
| 3,289,252 | 12/1966 | Bromley | 18/42D |
| 3,357,058 | 12/1967 | Kutik | 18/Dig.8 |
| 3,467,990 | 9/1969 | Kutik et al. | 18/Dig.8 |
| 3,488,810 | 1/1970 | Gellert | 18/42D |

FOREIGN PATENTS

| 868,957 | 5/1961 | Great Britain | 18/C & B dig. |

*Primary Examiner*—J. Howard Flint, Jr.
*Attorney*—Settle, Batchelder and Oltman ABSTRACT: A method and apparatus for molding bristled products in a manner such that the degree of deflection or nondeflection of bristles if positively controlled. The apparatus includes a mold having a backing part and a chase part forming a cavity and a pin having one or more flutes in a bore in the chase part communicating with the cavity. The cross-sectional shape of the flute and the rates at which heat is withdrawn from different sides of the bristle are specifically selected and controlled to produce deflection or inhibit deflection of the bristle or bristles as desired. Certain dimensions at the base of the bristles are also controlled to prevent distortion of bristles.

Patented May 11, 1971

INVENTORS
LOUIS F. KUTIK
ERICH W. GRONEMEYER
BY
Settle, Batchelder & Altman

INVENTORS
LOUIS F. KUTIK
ERICH W. GRONEMEYER

Patented May 11, 1971
3,577,843
5 Sheets-Sheet 3
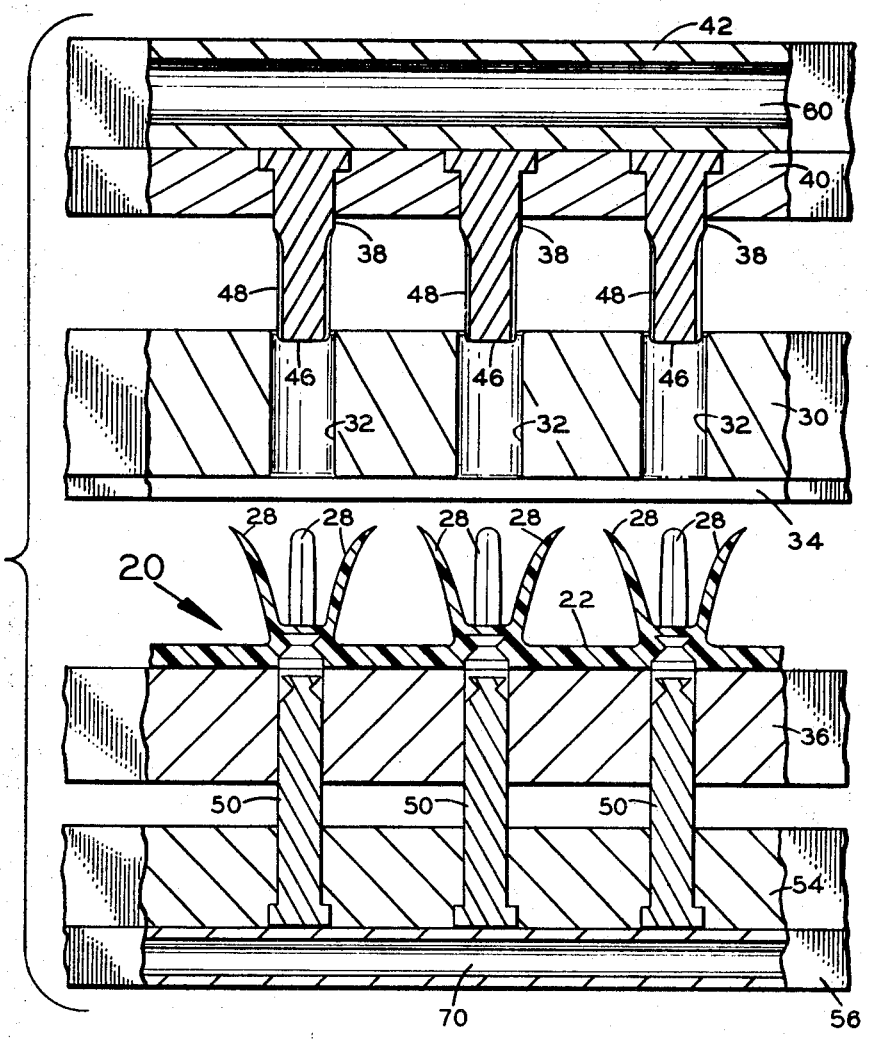
FIG. 7
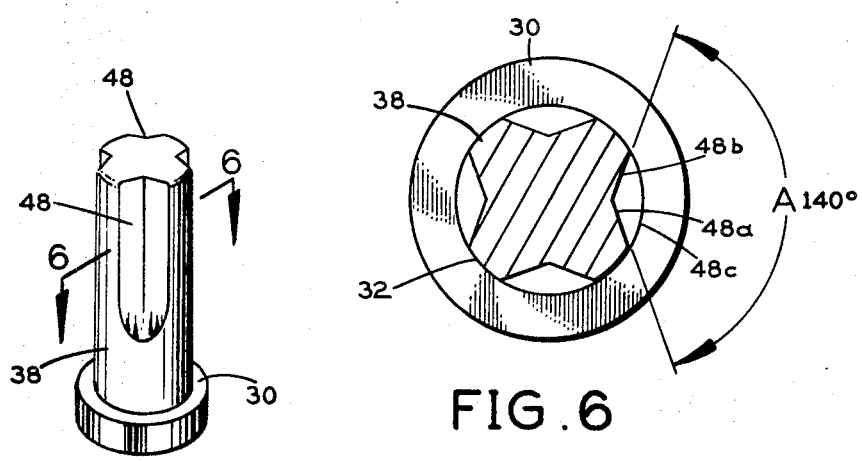
FIG. 5
FIG. 6
INVENTORS
LOUIS F. KUTIK
ERICH W. GRONEMEYER
BY
Settle, Batchelder & Altman Patented May 11, 1971

INVENTORS
LOUIS F. KUTIK
ERICH W. GRONEMEYER
BY
*Settle, Batchelder & Oltman*

Patented May 11, 1971

INVENTORS
LOUIS F. KUTIK
ERICH W. GRONEMEYER
BY
Settle, Batchelder & Altman 3,577,843

APPARATUS FOR CONTROLLING BRISTLE DEFLECTION

BACKGROUND OF THE INVENTION

A basic apparatus for molding bristled products using pins in holes to form bristle defining cavities are described and claimed in U.S. Pat. No. 2,592,296 to L. F. Kutik, one of the present inventors. Many types of bristled products may be made using this apparatus. Some of these products require straight bristles and others require deflected or bent bristles. Although some such products have been made, the configuration of the bristles has not been under positive control. That is, sometimes when trying to mold straight bristles, they have come out deflected, and other times when trying to mold deflected bristles, they have come out straight or deflected in the wrong direction.

An object of the present invention is to provide an apparatus for positively controlling the configuration of bristles of a molded product having bristles integral with a backing portion.

Another object of the invention is to provide an apparatus for controlling bristle deflection by control of bristle cross-sectional shape.

A further object is to control heat exchange during cooling of a molded bristled product in a manner to provide positive control over bristle deflection.

Another object of the invention is to provide an apparatus which can be implemented in a practical manner on a mass production basis.

Other objects of this invention will appear in the following description and appended claims, reference being had to the accompanying drawings forming a part of this specification wherein like reference characters designate corresponding parts in the several view.

ON THE DRAWINGS

FIG. 5 is a perspective view of a pin having flutes therein, the pin being used in the apparatus in FIGS. 2—4 to mold bristles on a product such as the mat of FIG. 1;

FIG. 6 is a sectional view taken along line 6—6 of FIG. 5 and looking in the direction of the arrows, with this view showing that the angle at the apex of each flute is approximately 140°;

FIG. 7 is an exploded sectional view showing the mold of FIGS. 2 through 4 in an open condition after a mat like that of FIG. 1 has been molded;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
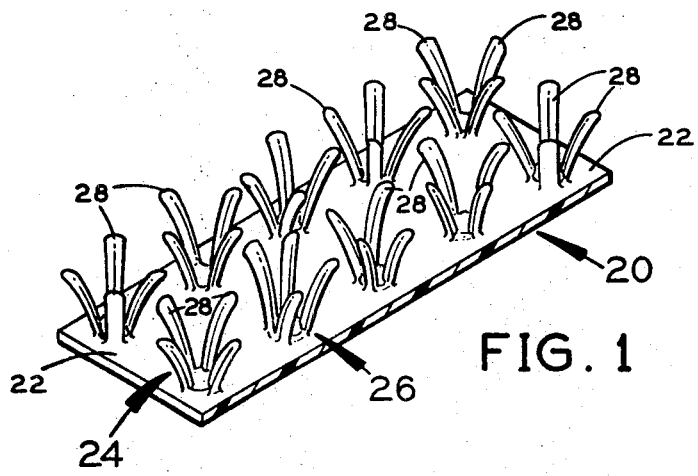
FIG. 1 is a perspective view of a mat consisting of a backing portion and bristles integral with the backing portion, the bristles of each group being deflected outwardly from a central area thereof.

The mat 20 shown in FIG. 1 has a backing portion 22 and groups of bristles such as 24 and 26 arranged in a pattern on the backing portion 22. Each of the bristles 28 is integral at the base thereof with the backing portion 22 and projects away from the backing portion. The bristles 28 in the group 24 are deflected or curve outwardly from the center of that group, and the bristles of the other groups likewise curve outwardly from the center of the respective group. It may be seen that the bristles of group 26 are offset rotationally with respect to the bristles of group 24 so that there is no interference between bristles when they are bent down, as for instance by a person stepping on the mat. Such a mat may be used for several purposes; for example, as a door mat or floor mat, as a ground covering which simulates actual grass, as a ground covering on a ski slope to provide a surface on which people can ski, and for other purposes as well. The mat is preferably made by injection molding of plastic material in a mold apparatus of the type shown in FIGS. 1 through 7.

This apparatus is of the general type described and claimed in the aforementioned U.S. Pat. No. 2,592,296, but it has provisions for positively controlling the deflection of the bristles 28. The apparatus includes a chase plate 30 which has a plurality of bores 32 through the same communicating with a mold cavity 34 defined by the chase plate and an adjoining backing plate 36. A pin 38 is located in each bore 32, and the upper end of each pin has a shoulder which affixes it to a pin plate 40 adjoining the chase plate 30. The pin plate 40 is affixed to a cover plate 42 which holds the pins 38 down, and in this embodiment screws 44 are used to connect plates 40 and 42 together.

The lower end 46 of pin 38 is recessed upwardly within bore 32, and it may be seen that a plurality of flutes 48 extend longitudinally of pin 38 from the end 46 to a point near the upper end of bore 32 but still within that bore. Thus, the pin 38 fits closely within the bore 32, and has a portion near the upper end of the bore which seals the bore to prevent escape of plastic from the bristle-defining cavities formed by the flutes and the surrounding surface of bore 32. The configuration of the bristle-defining cavities may be seen most clearly in FIG. 4 where the flutes 48 are shown in cross section.

The backing plate 36 has a plurality of projections provided by pin members 50, the upper ends of which are spaced slightly from the lower ends of the molding pins 38. The upper ends of pins 50 extend into the lower ends of bores 32. The upper ends of pins 50 are spaced from the lower ends 46 of pins 38 and also from the surrounding surface of bores 32 by a distance which is less than the thickness of the mold cavity 34 in order to prevent undesired distortion of the bristles which are molded on the backing portion.

The upper ends of pins 50 are undercut at 52 so as to anchor the pins to the plastic material which forms the backing portion of the bristled product during the molding operation. As will be explained further, when the mold is open, the pins 50 serve to strip the bristled product, which in this case is a mat, from the chase plate 30 and this is accomplished by anchoring the bristled product to the upper ends of the stripping pins 50 due to the undercuts 52 as mentioned previously. The lower ends of the pins 50 have shoulders which affix the pins to a pin plate 54, and the pin plate 54 is affixed to a base plate 56 by means of screws 58 so as to hold the stripping pins 50 in plate 54.

Figure 2:
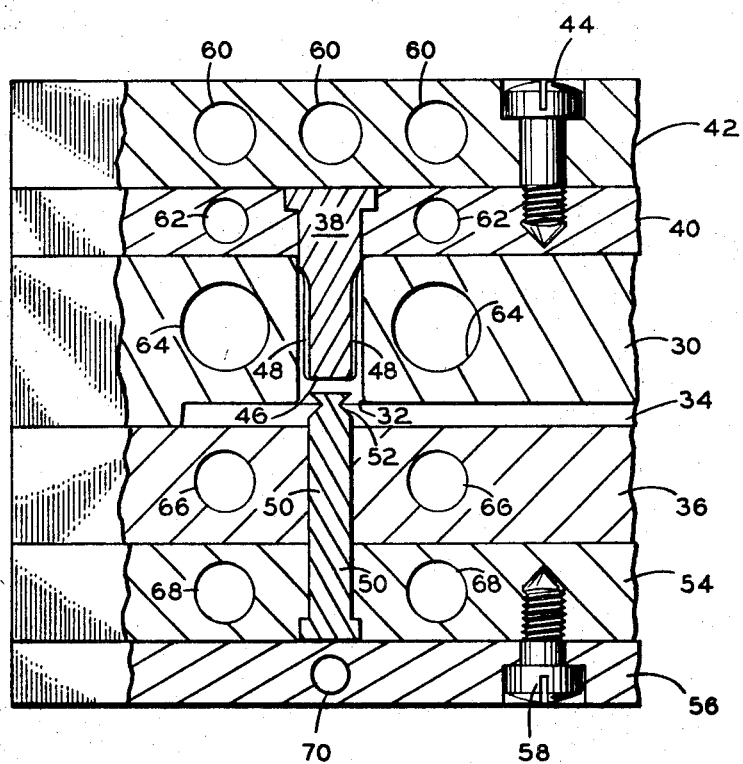
FIG. 2 is a vertical sectional view of a mold apparatus in accordance with one embodiment of the invention.
Figure 3:
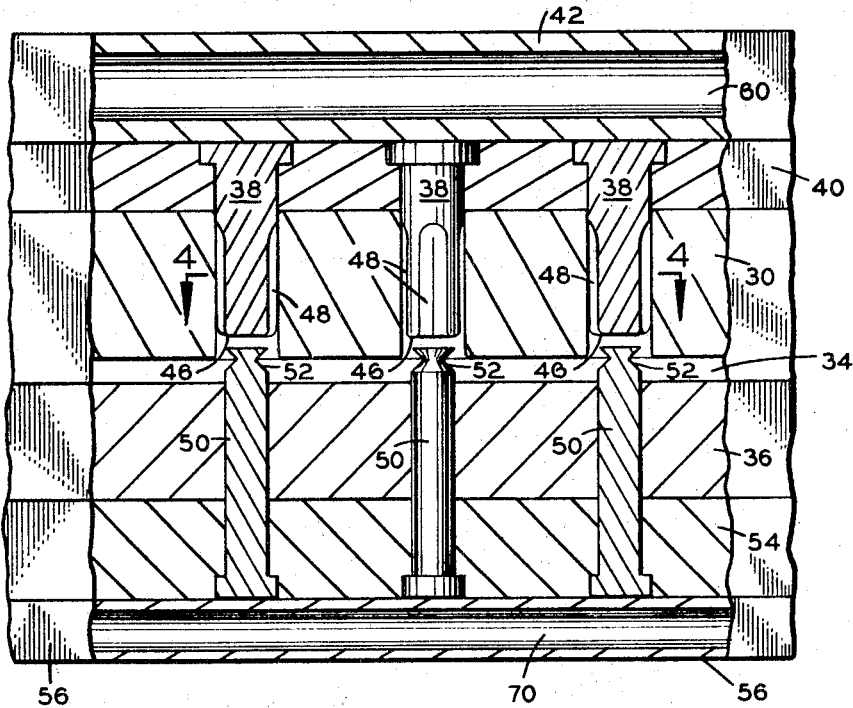
FIG. 3 is a vertical sectional view similar to FIG. 2 but taken along a plane at right angles to the plane of section of FIG. 2.
Figure 4:
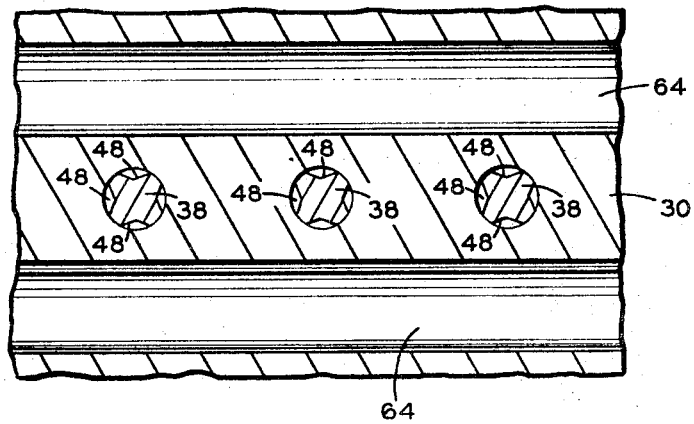
FIG. 4 is a fragmentary sectional view taken along line 4—4 of FIG. 3 and looking in the direction of the arrows.
Figure 8:
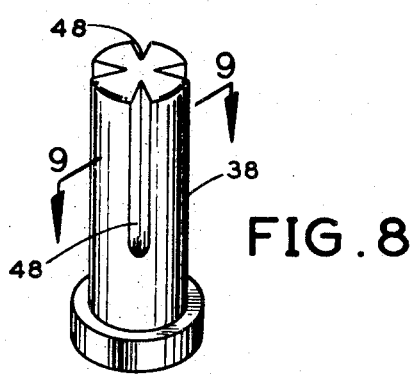
FIG. 8 is a perspective view of another pin having flutes for molding bristles, the flutes in this pin having a smaller angle at the apex thereof than those of the pin of FIGS. 5 and 6.

A plurality of fluid flow passages are provided in the mold apparatus, and as may be seen in FIG. 2, there are passages 60 in plate 42, passages 62 in plate 40, passages 64 in plate 30, passages 66 in plate 36, passages 68 in plate 54 and a passage 70 in plate 56. Some of these passages may be interconnected to form one or more fluid flow circuits for carrying cooling fluid through the mold apparatus. The passages are sufficiently close to the pins 38 and the bore 32 to control the rate of heat flow from the bristles formed in flutes 48 during the cooling of the plastic material in the molding operation. For example, cooling fluid flowing through passages 64 tends to extract heat from the outer surfaces of bristles formed in flutes 48. Conversely, fluid flowing in passages 60 and 62 tends to extract heat from the pins 38 thus tending to cool the surfaces of flutes 48 and thus cool the inner surfaces of the bristles formed in those flutes. By providing different rates of flow of cooling fluid in passages 62 and 60, it is possible to keep the outer surfaces of the bristles hotter than the inner surfaces during cooling, or conversely to keep the inner surfaces of the bristles hotter than the outer surfaces during cooling. This temperature differential controls the stresses which are set up in the bristles due to shrinkage during cooling.

This effect can be explained most clearly with reference to FIGS. 6 and 7. In FIG. 6, it may be seen that each flute in the pin 38 is bounded by two angular surfaces 48a and 48b formed in the pin 38, and a curved surface 48c of the chase plate 30. Surface 48c is really a part of the bore 32. In the embodiment of FIG. 6, the angle formed by surfaces 48a and 48b is about 140°, and this means that surface 48c is substantially longer than either surface 48a or 48b.

When molten plastic material is injected into the mold cavity 34 and from there into the bristle-defining cavities formed by flutes 48, the material comes into contact with surfaces 48a, 48b and 48c. During injection and after injection is completed, the material cools. During cooling, the material in each bristle-defining cavity shrinks. With a flute of the configuration shown in FIG. 6, the shrinkage tends to be taken up to material separating from the long surface 48c rather than the shorter surfaces 48a and 48b. Thus, the material of the bristle pulls away slightly from surface 48c, but does not pull away much from surfaces 48a and 48b. This differential shrinkage in the bristle tends to make the bristle deflect outwardly, or toward surface 48c, in the manner shown in FIG. 7.

FIG. 7 is a view of the various parts of the molds after they have been separated to strip the mat 20 from the mold. It may be seen that the bristles have been withdrawn from the bristle-defining cavities and the mat has been removed from the chase plate 30. After that stage of separation has been completed, the stripping pins 50 are withdrawn from the backing portion of the mat as shown. This frees the bristled product 20 so that it can be ejected from the mold.

Referring again to FIG. 6, the deflection of the bristles in the manner shown in FIG. 7 can be aided by controlling the temperature of the pin 38 and the chase plate 30 during the cooling process. If the pin 38 is kept hotter than the chase plate 30 during cooling, the material in the bristle which solidifies last will be closer to the pin 38 than to the chase plate 30. This tends to augment the shrinkage of material away from surface 48c rather than away from surfaces 48a and 48b, thus tending to increase the deflection of the bristles 28 outwardly in the manner shown in FIG. 7. This temperature control over the pin 38 and the chase plate 30 is provided by means of flow of cooling fluid through the passages in the mold apparatus as previously described.

Figure 9:
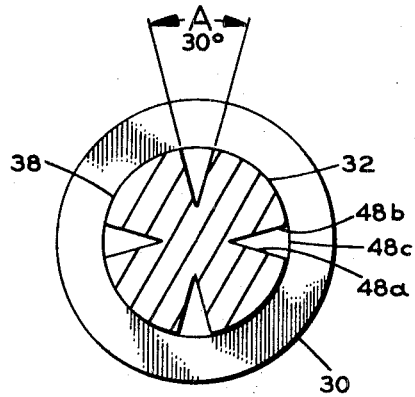
FIG. 9 is a cross-sectional view of the pin of FIG. 8 taken along line 9–9 and showing that the angle of the flutes at the apex thereof is about 30°.
Figure 10:
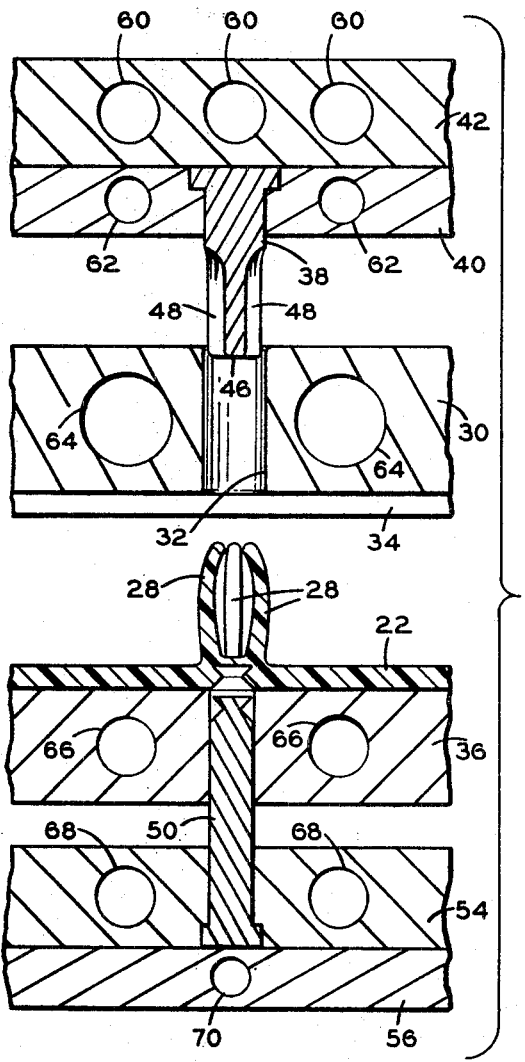
FIG. 10 is an exploded sectional view of a mold using the pin of FIGS. 8 and 9 and showing a portion of a mat having inwardly deflected bristles as a result of the shape of the flutes in the pin and the temperature pattern in the mold.
Figure 11:
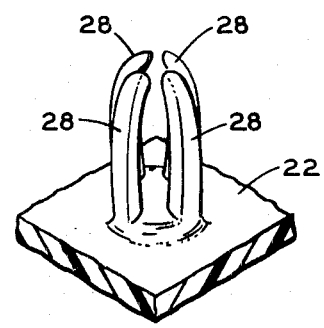
FIG. 11 is a fragmentary perspective view of a group of inwardly deflected bristles like those shown in FIG. 10.
Figure 12:
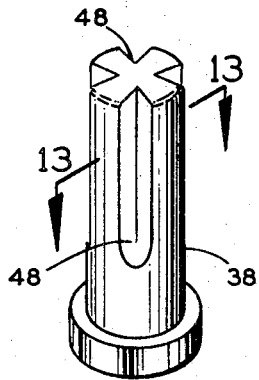
FIG. 12 is a perspective view of still another pin having flutes therein.

Referring now to FIGS. 8 through 11, the same reference numerals are used in these FIGS. as in the previously described FIGS. since the only difference is that the angle between the surfaces 48a and 48b in FIG. 9 is 30° rather than 140° as in FIG. 6. With a small angle such as 30°, the surface 48c is substantially shorter than either surface 48a or 48b. Thus, when the molten plastic material is injected into the cavity 34 and from there into the bristle-defining cavities formed by the flutes 48, and then begins to cool, the material tends to shrink away from surfaces 48a and 48b more than from surface 48c because the longer surfaces are the weakest part of the bristle. Also, the material which is last to cool is located closer to surface 48c than to the apex formed by surfaces 48a and 48b. Thus, when the surface 48c is shorter than surfaces 48a and 48b, the bristles formed by these surfaces tend to curve or deflect inwardly in the manner shown in FIGS. 10 and 11.

This inward deflection of the bristles can be augmented by proper temperature control of the pin 38 and chase plate 30. As previously indicated, the material of each bristle which solidifies last is located closer to surface 48c than to the apex formed by surfaces 48a and 48b. Thus, if the chase plate 30 is kept hotter than the pin 38 during cooling of the material, this will tend to move the center of the material last to solidify even closer to surface 48c. Thus, the material tends to shrink even further away from surfaces 48a and 48b during cooling, thus further tending to deflect the bristles inwardly in the manner shown in FIGS. 10 and 11.

Figure 13:
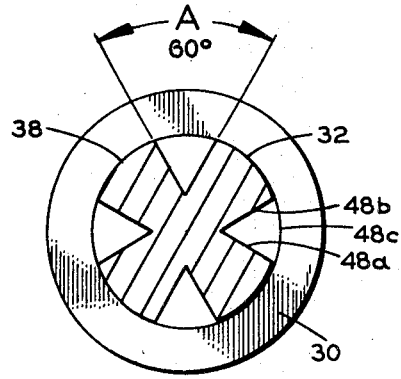
FIG. 13 is a cross-sectional view of the pin of FIG. 12 taken along line 13–13 of FIG. 12 and looking in the direction of the arrows, this view showing that the angle at the apex of each flute is about 60°.
Figure 14:
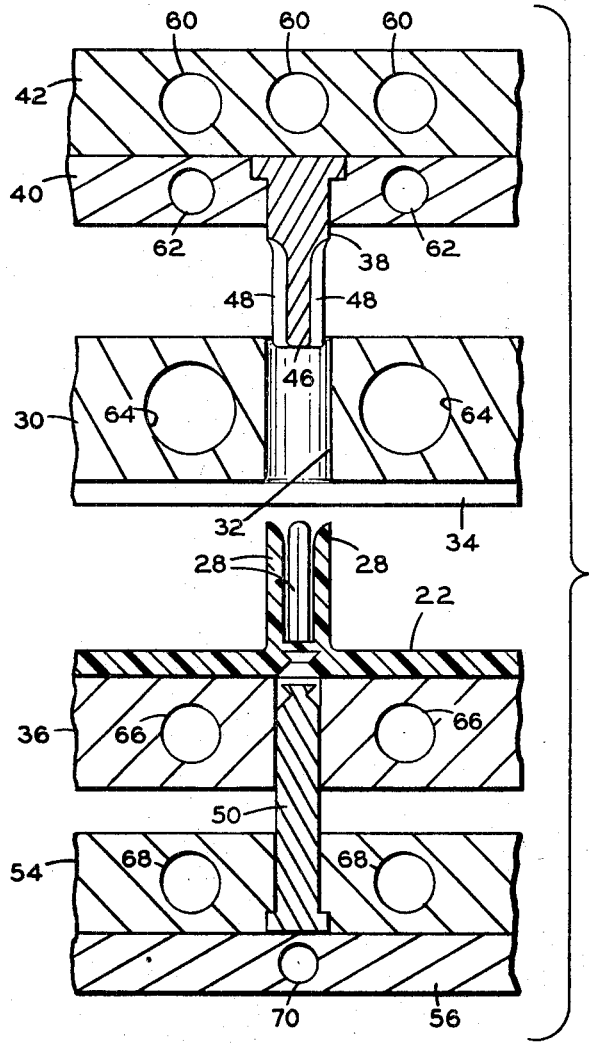
FIG. 14 is an exploded sectional view of a mold using the pin of FIGS. 12 and 13 and showing a portion of a mat having straight bristles which result from the shape of the flutes of the pin and the temperature pattern in the mold during molding.
Figure 15:
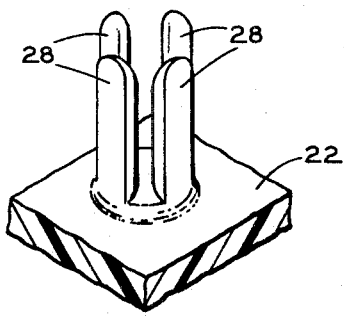
FIG. 15 is a fragmentary perspective view of a portion of a mat having straight bristles like those shown in FIG. 14.

FIGS. 12 through 15 illustrate the conditions which are desired in order to obtain straight bristles. The same reference numerals are used for like parts in these FIGS. as have been used in the previously described FIGS. since the only difference is that the surfaces 48a and 48b form an angle of 60° between them. Thus, the surfaces 48a, 48b and 48c are approximately equal in length, although surface 48c is slightly longer due to its curvature. When hot plasticized material is injected into cavity 34 and into the bristle-defining cavities formed by flutes 48, it contacts surfaces 48a, 48b and 48c. During cooling of this material, shrinkage tends to be taken up equally at all three sides of the bristle. Thus, the material does not shrink away from one surface any more than from another. The material which is last to solidify tends to be at the geometrical center of the triangle formed by the three sides. Thus, there is no unequal shrinkage which might tend to cause the bristle to deflect. As a result, the bristles formed by the mold tend to be straight as shown in FIGS. 14 and 15. This effect is enhanced or maintained by keeping the temperature of the chase plate 30 about the same as the temperature of the pin 38 during cooling so that the last material to solidify tends to stay at the center of the bristle.

It is not essential that the temperature conditions be controlled so as to augment the effect which is produced by the cross section of the bristles, but this is desirable. However, with an equal-sided bristle as shown in FIG. 13, it would be possible to provide a temperature differential which would tend to cause the bristles to deflect one way or the other as desired. Also, it is possible to provide one flute of one cross-sectional shape and another flute of another cross-sectional shape in the same pin. Thus, one 60° angle flute, one 30° angle flute and one 140° angle flute might be provided in a single pin so as to provide a group of bristles, one of which curves inwardly, one of which curves outwardly and one of which is straight. Such an arrangement of bristles may be very desirable for a ground covering mat or a floor covering mat to achieve a more or less random orientation of the bristles or blades on the mat.

It is apparent from the foregoing description that the invention provides an apparatus for positively controlling the degree of deflection or nondeflection of bristles formed on a backing. Although mats have been described, it will be apparent that other types of bristled products may be made in accordance with the invention.

We claim:

1. In a mold apparatus for use in molding a bristled product in a manner to control the configuration of bristles of said product, said mold apparatus including a chase part and a backing part defining, when closed, a mold cavity for molding a backing portion of said product, said chase part having at least one bore therein communicating with said mold cavity, a pin having a close fit with said bore and having at least one longitudinally extending flute on its side surface communicating with said mold cavity for molding a bristle integral with said backing portion of said product, the end of said flute remote from said mold cavity being closed when said pin is in an operating position in said bore, at least one of said pin and chase and backing parts being movable, the improvement wherein said flute as a cross-sectional shape controlled to produce a desired degree of deflection or nondeflection of said bristle, and said mold apparatus has fluid flow passage means therein for conducting cooling fluid, with said passage means being located sufficiently close to said pin and said bore and having a cooling fluid flow rate therein to control the temperature of a bristle or bristles during cooling thereof after molding in a manner wherein the cross-sectional shape of said flute and the rates of heat flow through said pin and said chase part respectively produce a desired degree of deflection or nondeflection of said bristle when said bristle shrinks incident to molding thereof.

2. The mold apparatus as claimed in claim 1 in which said flute is bounded on one side by a continuous surface of said chase part which is longer transversely of said flute than any other continuous surface bounding said flute, thereby tending to produce deflection of the corresponding bristle toward said longer surface.

3. The mold apparatus as claimed in claim 2 in which said longer surface of said chase part is curved.

4. The mold apparatus as claimed in claim 1 in which said backing part has a projection extending therefrom into said mold cavity opposite said pin and spaced from the end of said pin a distance less than the thickness of said cavity adjacent said projection for inhibiting undesired distortion of a bristle or bristles.

5. The mold apparatus as claimed in claim 4 in which said projection is also spaced from a projecting side portion of said bore a distance less than said thickness of said cavity also for inhibiting distortion of said bristle or bristles.

6. The mold apparatus as claimed in claim 4 in which said projection is a movable member.

7. The mold apparatus as claimed in claim 4 in which said projection has an undercut tip to aid in stripping said bristled product.

8. The mold apparatus as claimed in claim 1 in which said flute is bounded by continuous surfaces of said pin at least one of which is longer transversely of said flute than the surface of said chase part bounding said flute, thereby tending to produce deflection of the corresponding bristle toward said longer surface or surfaces.

9. The mold apparatus as claimed in claim 1 in which said flute is bounded by a plurality of surfaces which are substantially equal in length measured transversely of said flute, thereby tending to inhibit deflection of said bristle.

10. In a mold apparatus for use in molding a bristled product in a manner to control the configuration of bristles of said product, said mold apparatus including a chase part and a backing part defining, when closed, a mold cavity for molding a backing portion of said product, said chase part having at least one opening in the same communicating with said mold cavity, a pin having a close fit with said opening and having a plurality of longitudinally extending flutes on its side surface communicating at one end with said mold cavity for molding bristles integral with said backing portion of said product, the ends of the flutes remote from said mold cavity being closed when said pin is in said opening, and means to relatively move said pin and said chase and backing parts to strip a molded product after molding thereof, the improvement wherein said flutes have a cross-sectional shape controlled to produce a desired degree of deflection or nondeflection of said bristles, and said mold apparatus has fluid flow passage means therein for conducting cooling fluid, with said passage means being located sufficiently close to said pin and said opening and have a cooling fluid flow rate therein to control the temperature of the bristles as they are cooling in response to fluid flow in said passage means and in a manner wherein the cross-sectional shapes of the flutes and the rates of heat exchange through said pin and through said chase part produce a desired degree of deflection and/or nondeflection of said bristles when said bristles shrink incident to molding thereof.

11. The mold apparatus of claim 10 in which at least one of said flutes is shaped to produce deflection of bristles molded therein in one direction, at least one other of said flutes is shaped to produce deflection of a bristle molded therein in another direction, and at least one other of said flutes is shaped to inhibit deflection of a bristle molded therein.

12. The mold apparatus as claimed in claim 10 in which said backing part has a projection extending therefrom into said mold cavity opposite said pin and spaced from the end of said pin a distance less than the thickness of said cavity adjacent said projection for inhibiting distortion of a bristle or bristles.

13. The mold apparatus as claimed in claim 12 in which said projection is also spaced from a projecting side portion of said opening a distance less than said thickness of said cavity also for inhibiting distortion of said bristles.

14. The mold apparatus as claimed in claim 13 in which said projection is a movable member.

15. The mold apparatus as claimed in claim 14 in which said movable member has an undercut tip to aid in stripping said bristled product when said mold apparatus is opened.